April 6, 1948.　　W. A. STOCKTON ET AL　　2,439,152
FEEDER FOR HAY BALERS
Filed Nov. 10, 1945　　2 Sheets-Sheet 2
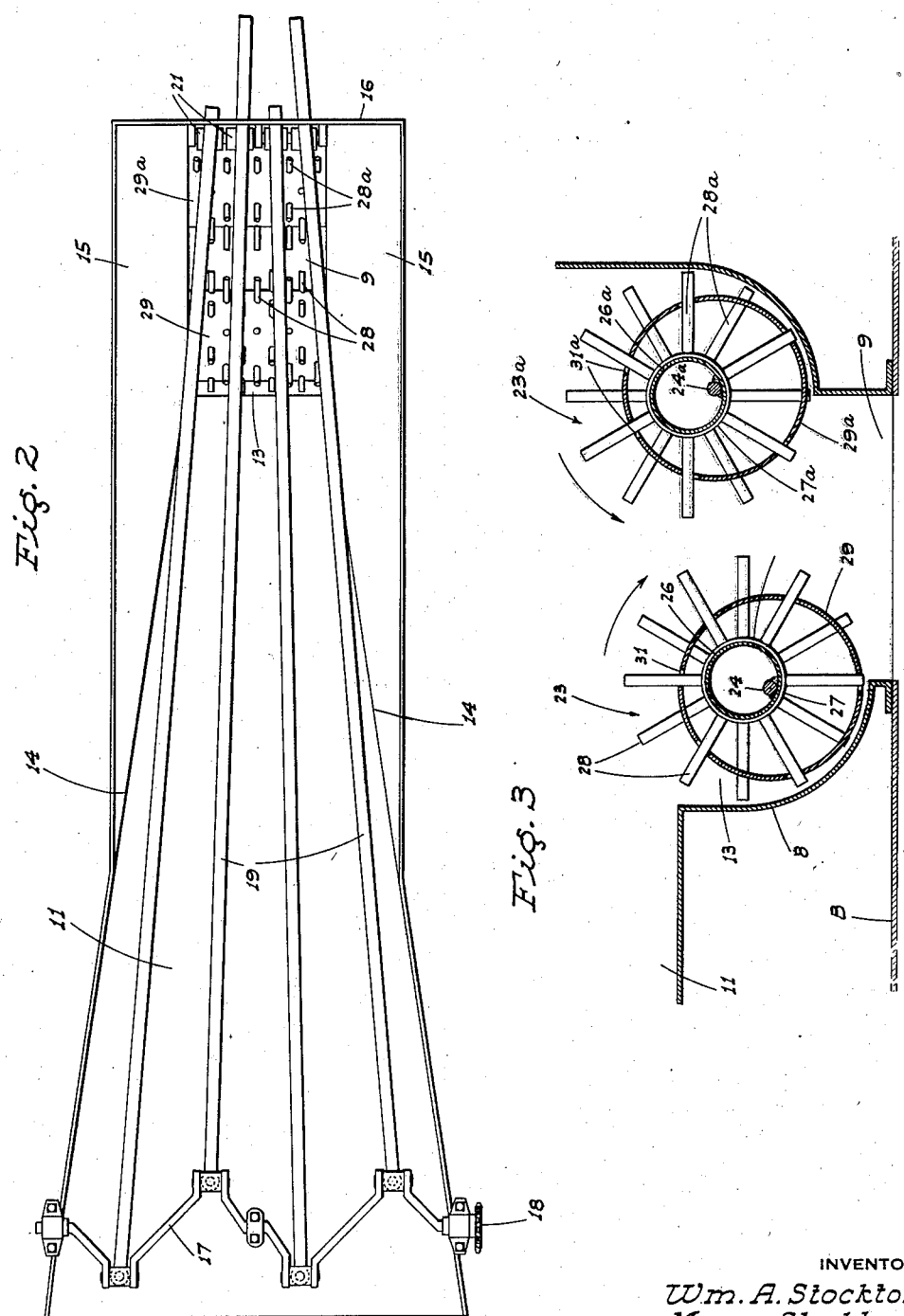
INVENTORS
Wm. A. Stockton
Mason Stockton
BY
ATTORNEYS Patented Apr. 6, 1948

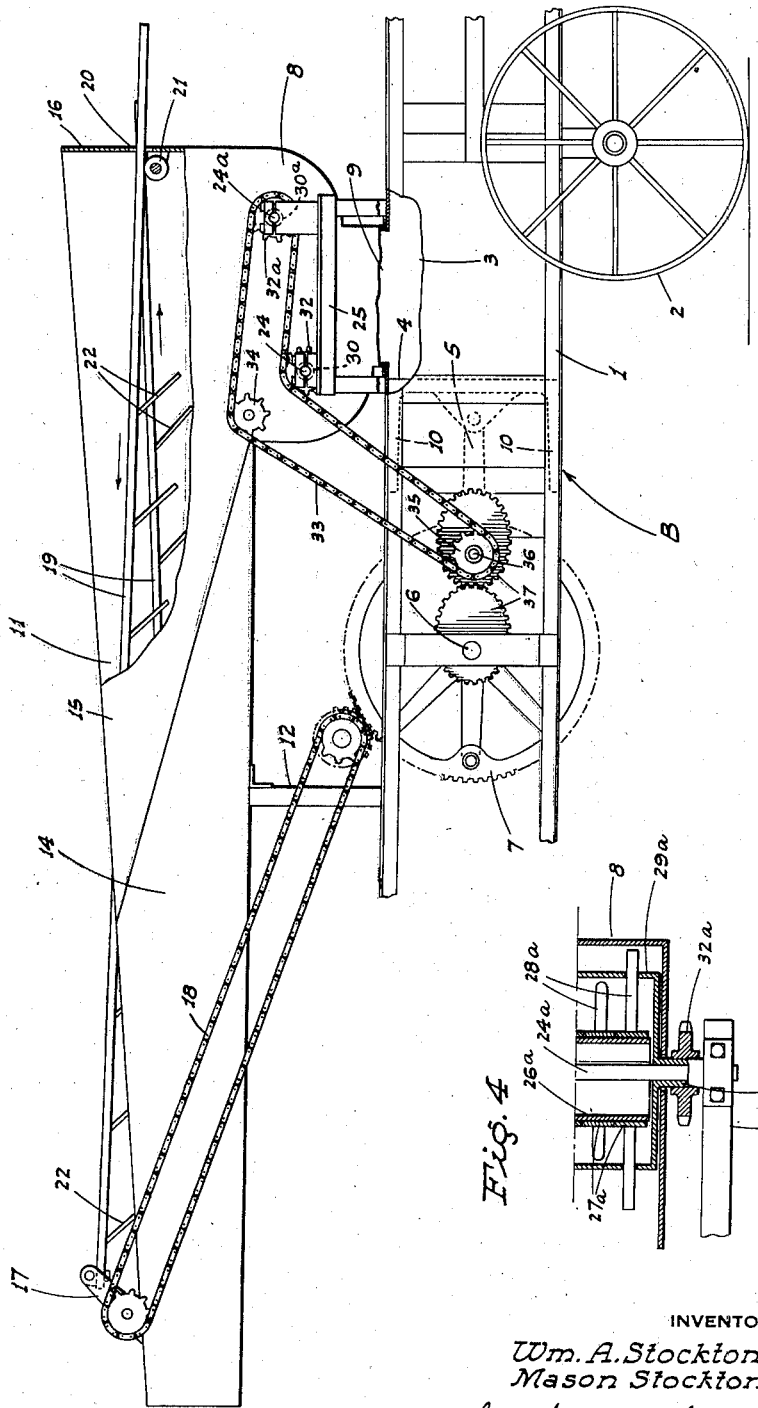

2,439,152

UNITED STATES PATENT OFFICE 2,439,152

FEEDER FOR HAY BALERS

William A. Stockton and Mason Stockton,
Willows, Calif.

Application November 10, 1945, Serial No. 627,915

8 Claims. (Cl. 100—25)

This invention relates generally to improvements in hay balers.

One object of the present invention is to provide a novel feeder for hay balers, which feeder is operative to materially increase the capacity of the implement, while at the same time eliminating the necessity of direct hand feed of the hay to the hopper.

A further object of the invention is to provide a feeder for hay balers which is so constructed and operates in such manner that the usual walking-beam type hay feeding plunger unit may be omitted from the implement.

Another object of the invention is to provide a feeder for hay balers which includes a novel feeder trough assembly which is elongated lengthwise of the implement, and into which the hay may be continuously fed by a pick-up elevator; the assembly then automatically delivering the hay to the hopper of the baler, and the rotary feeding drum units which are mounted in said hopper.

An additional object is to provide a feeder for hay balers, as in the preceding paragraph, in which said rotary feeding drum units are of novel construction and operation; the same functioning to feed hay to the baling chamber faster when the presser head is retracted; i. e. between strokes of said presser head.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a side elevation of the invention as embodied in a hay baler.

Figure 2 is a plan view of the feeder trough assembly.

Figure 3 is an enlarged fragmentary sectional elevation taken through the feed hopper and the rotary feeding drum units therein.

Figure 4 is an enlarged fragmentary sectional plan view showing an end portion of one of the rotary feeding drum units.

Referring now more particularly to the characters of reference on the drawings, the letter B indicates generally, and somewhat diagrammatically, a power driven hay baler which includes a main frame 1 supported by transversely spaced ground engaging wheels 2. Within the main frame 1 the baler is formed with a baling chamber 3 which extends lengthwise of the implement. A presser head 4 is slidably mounted in the main frame 1 for reciprocating motion in the baling chamber 3; said presser head being reciprocated through the medium of a connecting rod 5 coupled to a main crank shaft 6 journaled on the frame 1. The main crank shaft 6 is driven through the medium of a bull wheel 7.

Above the baling chamber 3 there is mounted an upstanding hopper 8 having a downwardly extending throat 9 which communicates with the top of the baling chamber 3; the presser head 4, when retracted, being clear of said throat. The presser head includes top and bottom skirts 10 which extend back from the same; the top skirt closing the hopper throat 9 upon advance of said presser head through the baling chamber.

Above the hopper 8 and extending therefrom lengthwise of the implement in one direction is an elongated, open-topped trough 11 supported, intermediate its ends, from the main frame 1 by a supporting structure, shown in part at 12. At its rear end the trough 11 is supported by, and formed in integral relation with, the hopper 8; the trough at said end having a bottom opening 13 in register and communicating with said hopper.

The trough 11 includes upstanding sides 14 which converge toward the rear end of said trough, i. e. toward the opening 13, with the rear end portions of said sides flaring upwardly and outwardly, as at 15. The trough also includes a rear end wall 16.

A multiple-throw crank shaft 17 extends between, and is journaled in connection with, the sides 14 of the trough adjacent its front end, and said crank shaft 17 is driven indirectly from the main crank shaft 6 by means of an endless chain and sprocket unit 18.

A plurality of feeder rods 19 are connected to the several cranks of the multiple-throw crank shaft 17, and extend rearwardly in somewhat convergent relation through corresponding openings 20 in the rear end wall 16 of the trough; said rods being supported, at said openings, by rollers 21.

Each of the feeder rods 19 is fitted with a plurality of longitudinally spaced, downwardly extending hay feeding fingers 22 which extend at a rearward slope.

With rotation of the multiple-throw crank shaft 17 the feeder rods 19 alternately advance and then retract in the trough 11, with the rods somewhat elevated upon the retracting portion of the stroke. Also, as the feeder rods 19 are crank shaft driven, certain of the rods are advancing while others are retracting.

Due to the elongation of the trough 11 hay may be fed thereto in a continuous stream by a conventional pick-up elevator. After being fed into the trough the hay is advanced by the feeder rods 19 forwardly to the trough opening 13, from whence it is fed through the hopper 8 in the manner hereinafter described:

In the hopper there is provided a pair of novel rotary feeding drum units, indicated generally at 23 and 23a, which are mounted and constructed as follows:

The rotary feeding drum units extend transversely in the hopper 8 in spaced relation with the rearmost feeding drum unit 23a disposed somewhat higher than the other feeding drum unit. Both of the rotary feeding drum units are of a diameter to extend upwardly through the trough opening 13 to a certain extent, and as the rearmost drum unit 23a is at a higher elevation than the other unit, positive feed of the hay from the trough 11 through the hopper 8 is assured, and without the hay tending to override said rearmost unit 23a.

The rotary feeding drum units 23 and 23a are of finger type, and are identical, so that a description of one will suffice for both.

The rotary feeding drum unit 23 comprises a center shaft 24 which is fixed, at its ends, in non-rotatable relation to supporting frames 25 upstanding from the main frame 1 on opposite sides of the hopper 8. Within the hopper 8 the shaft 24 is fixed with an eccentrically mounted, transversely extending supporting cylinder 26 on which a full length rotary sleeve 27 is disposed; said sleeve having a multiplicity of circumferentially spaced fingers 28 projecting radially outwardly therefrom.

The assembly of the supporting cylinder 26 and rotary sleeve 27 is surrounded by an enlarged full-width drum 29 journaled at its ends, as at 30, on the shaft 24 for concentric rotation thereabout.

The fingers 28 are elongated and slidably project through openings 31 in said drum. The drum 29 is driven, in the direction shown by the arrows in Fig. 3, through the medium of an external sprocket 32. The drive for this sprocket 32 will hereinafter be described in detail.

As the supporting cylinder 26 is mounted in upwardly eccentric relation to the shaft 24, it will be seen that with rotation of the drum 29, the fingers 28, together with the rotary sleeve 27 which carries the same, will be rotated about the axis of the supporting cylinder 26, and the fingers 28 will have a maximum projection outwardly of the drum 29 at the top of the latter. Thereafter, with downward rotation, the fingers will progressively retract into said drum until the bottom of the latter is reached, and at which point the fingers have substantially no projection. The advantage of this feature is that the rotary feeding drum units thus have no tendency to feed hay upward on the back side of said units, and the hay is freed for delivery through the hopper throat 9 into the baling chamber 3.

The unit 23a comprises parts 24a, 26a, 27a, 28a, 29a, 30a, 31a and 32a, which are like the parts 24, 26, 27, 28, 29, 30, 31 and 32 and function the same except that the drum 29a is driven in the reverse direction to that of the drum 29 as shown by the arrow in Fig. 3.

The rotary feeding drum units 23 are normally rotating, but the speed of rotation is accelerated when the presser head 4 is retracted clear of the throat 9, whereby to then speed up the delivery of hay into said baling chamber. Such drive of the rotary feeding drum units 23 is accomplished as follows:

An endless chain 33 leads in reverse driving relation over the sprockets 32, with one run of said chain carried by an idler sprocket 34. At the end opposite the sprockets 32 the endless chain 33 extends about a sprocket 35 fixed on a shaft 36 adjacent and parallel to the main crank shaft 6. The shaft 36 is driven, at recurringly variable speed, from the main crank shaft 6 by a pair of elliptical spur gears 37. The arrangement and timing of said elliptical spur gears is such that on the back stroke of the presser head 4, said elliptical spur gears then impart a more rapid rotation to the rotary feeding drum units 23, for the purpose hereinbefore described.

The rotary feeding drum units 23 assure of a positive and efficient delivery of the hay from the trough 11 into the baling chamber 3.

From the foregoing description it will be readily seen that such a device has been produced as will substantially fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. In combination with a hay baler which includes a baling chamber, a feeder for delivering material to the baling chamber, such feeder comprising a hopper disposed in communication with the chamber, an elongated trough mounted on the baler with one end portion of said trough above the hopper, said one end portion of the trough having a bottom opening communicating with said hopper, and power driven feeding mechanism in the trough operative to feed hay therealong to said opening; said feeding mechanism including a plurality of transversely spaced feeder rods disposed lengthwise in the trough above the bottom thereof, said feeder rods converging in the direction of feed and extending over the bottom opening of the trough, hay engaging elements depending from the rods, and means to reciprocate the rods in the trough.

2. In combination with a hay baler which includes a baling chamber, a feeder for delivering material to the baling chamber, such feeder comprising a hopper disposed in communication with the chamber, an elongated trough mounted on the baler with one end portion of said trough above the hopper, said one end portion of the trough having a bottom opening communicating with said hopper, and power driven feeding mechanism in the trough operative to feed hay therealong to said opening; said feeding mechanism comprising a multiple-throw crank shaft extending across the trough adjacent the end opposite said bottom opening, a plurality of transversely spaced feeder rods connected to said crank shaft and extending along the trough above the bottom in converging relation to and over said bottom opening, means supporting the rods beyond the opening in a direction opposite the crank shaft, forwardly and downwardly inclined hay feeding fingers on the rods, and means to drive the crank shaft.

3. In combination with a hay baler which includes a baling chamber, a feeder for delivering material to the baling chamber, such feeder comprising a hopper disposed in communication with the chamber, an elongated trough mounted on the baler with one end portion of said trough above the hopper, said one end portion of the trough having a bottom opening communicating with said hopper, power driven feeding mechanism in the trough operative to feed hay therealong to said opening; and power driven rotary feeding drum units mounted in cooperative relation in the hopper whereby to feed hay from said bottom opening of the trough into the baling chamber.

4. A feeder as in claim 3 in which there are a pair of said rotary feeding drum units disposed transversely in the hopper with the upper peripheral portion of one of said units extending through the bottom opening into the trough, said one unit being the most remote unit relative to the feed through the trough.

5. A feeder as in claim 3 in which there are a pair of said rotary feeding drum units disposed transversely in the hopper, the upper peripheral portion of the most remote unit relative to the feed through the trough projecting above the corresponding portion of the other unit and through said bottom opening into the trough.

6. In combination with a hay baler which includes a baling chamber, a feeder for delivering material to the baling chamber, such feeder comprising a hopper disposed in communication with the chamber, a pair of transverse feeding drum units rotatably mounted in the hopper in adjacent but spaced-apart cooperative relation, and means to drive said drum units with adjacent sides moving in a downward direction; the baler including a presser head power reciprocated to advance and retract through the baling chamber, and said driving means for the drum units being operative to impart an increased-speed drive to the units when the presser head is in retracted position.

7. In combination with a hay baler which includes a baling chamber, a feeder for delivering material to the baling chamber, such feeder comprising a hopper disposed in communication with the chamber, an elongated feed trough having one end overlying the hopper and provided at such end with an opening into the hopper, a pair of feed rollers disposed in the hopper in spaced apart relation, means to drive the feed rollers with adjacent sides moving in a downward direction, a plurality of material feeding elements disposed for reciprocating movement longitudinally throughout the length of the trough and overlying the feed rollers, and means to impart motion to said feeding elements.

8. In combination with a hay baler which includes a baling chamber, a feeder for delivering material to the baling chamber, such feeder comprising a hopper disposed in communication with the chamber, a pair of transverse feeding drum units rotatably mounted in the hopper in adjacent but spaced-apart cooperative relation, and means to drive said drum units with adjacent sides moving in a downward direction; said driving means including meshing elliptical gears operative to impart a variable speed drive to the drum units, the baler including a power reciprocated presser head and the gears driving the drum units faster when the presser head is at the end of its back stroke.

WILLIAM A. STOCKTON.
MASON STOCKTON.

REFERENCES CITED

The following references are of record in the file of this patent:

UNITED STATES PATENTS

| Number | Name | Date |
|---|---|---|
| 1,456,265 | Brooks | May 22, 1923 |
| 1,564,629 | Ruth | Dec. 8, 1925 |
| 1,716,112 | Cameron | June 4, 1929 |
| 1,827,024 | Kisby | Oct. 13, 1931 |